United States Patent [19]

Sziklas

[11] 4,123,150

[45] Oct. 31, 1978

[54] STABLE RESONATORS FOR RADIAL FLOW LASERS

[75] Inventor: Edward A. Sziklas, North Palm Beach, Fla.

[73] Assignee: United Technologies Corporation, Hartford, Conn.

[21] Appl. No.: 789,751

[22] Filed: Apr. 21, 1977

[51] Int. Cl.² .............................................. H01S 3/081
[52] U.S. Cl. ................................. 350/294; 331/94.5 C; 350/299
[58] Field of Search .................... 331/94.5 C, 94.5 D; 350/294, 299, 300

[56] References Cited

U.S. PATENT DOCUMENTS 3,919,664  11/1975  McAllister ..................... 331/94.5 C

*Primary Examiner*—William L. Sikes
*Attorney, Agent, or Firm*—Lawrence A. Cavanaugh

[57] ABSTRACT

A stable resonator is disclosed capable of providing a laser beam having both high power and good optical quality from a large volume gain medium. The stable resonator is formed having an optical cavity defined at one end by an unstable resonator and at the other end by a reflector in optical communication with the unstable resonator.

12 Claims, 3 Drawing Figures

STABLE RESONATORS FOR RADIAL FLOW LASERS

BACKGROUND OF THE INVENTION

1. Field of the Invention

The present invention relates to radial flow lasers and more particularly to optical resonators capable of accommodating a large volume of gain medium and providing an output beam having good optical qualities.

2. Description of the Prior Art

Laser systems which provide output beams at very high power levels, such as those made possible with combustion driven chemical lasers are subject to various restraints which limit the actual output power. One of these limitations is due to a phenomenon which is commonly referred to as superfluorescence, a condition under which a gain medium having a population inversion produces spurious beams of laser radiation without an interaction with any optical components of the resonator. These spurious beams are undesirable because they deplete the population inversion which would otherwise be available for controlled stimulated emission from the working medium.

One of the concepts advanced to obtain output beams having high power levels without incurring superfluorescence effects is disclosed by Freiberg et al. in the U.S. Pat. No. 3,969,687 entitled "Standing Wave Unstable Resonators for Radial Flow Lasers" filed on Apr. 14, 1975 and held with the present application by a common assignee. The unstable resonator is formed having a centerline axis with a gain region in the configuration of a thin wall cylinder and disposed symmetrically about the centerline axis and between the optical components defining the unstable resonator. A cylindrical gas source region is disposed adjacent to the interior of the gain region and symmetric about the centerline axis. The system optics form an unstable resonator and the output beam is annular in cross section. The resonator is an unstable standing wave positive branch confocal device in which toroidal and annular mirrors are utilized. High optical quality of the output beam results from the effective discrimination against the high order transverse modes which is provided by the region of common resonance dominated by the diffraction cross coupling of the device.

Another concept advanced to provide an output beam with enhanced power, energy distribution and optical characteristics is disclosed by Chenausky et al. in the U.S. Pat. No. 3,921,096 entitled "Unstable Split Mode Laser Resonator" filed Dec. 16, 1974 and held with the present application by a common assignee. The unstable split mode resonator is of complex design utilizing two separate volumes of gain medium, each of which has dimensions no greater than the limitations imposed by superfluorescence. The phase of the beam in each of the regions becomes locked to the phase of the beam from the other region by an area of common resonance. The active gain medium is disposed between the optical components forming the unstable resonator and the resulting output beam has an annular cross section.

Another approach to increasing the output power involves arranging the gain medium in the form of a cylindrical sheath such as that produced by a radial flow configuration so that a relatively large volume can be handled without exceeding the superfluorescence length limitations. The sheath is positioned within a relatively simple unstable resonator comprising an annular convex toroidal surface at one end of the cylindrical sheath and an annular concave toroidal mirror at the other end of the cylindrical sheath. The utility of such a resonator configuration is severely limited by the poor optical quality of the laser beam which results therefrom. An unstable resonator arranged in such a cylindrical geometry has a high Fresnel number which is defined as the square of the outer diameter of the cylindrical sheath of the active medium divided by four times the product of the laser wavelength and the length of the cylinder. The high Fresnel number is an indication of very little coupling of the annular output beam phase front around the circumference of the cavity as the beam propagates between the mirrors and through the circumferentially oriented gain medium. As a consequence, such a resonator displays very poor mode discrimination and is prone to support high azimuthal modes, which have far field energy distribution exhibiting a minimum on the optical axis and departing significantly from the diffraction limited operation.

Present resonators for use with annular gain configurations in chemical lasers are of complex design, requiring the use of aspheric and conical optical components which have extremely difficult manufacturing problems and often produce annular output beams. Designs which use simple mirrors and produce an output beam having a continuous cross section, and lowest order mode are desirable.

SUMMARY OF THE INVENTION

A primary object of the present invention is to provide a laser beam having both high power and good optical quality with a stable resonator capable of having a large volume of gain medium.

According to the present invention a stable resonator is formed having an optical cavity defined at one end by an unstable resonator and at the other end by a reflector. In one embodiment the stable resonator includes an unstable resonator having means for coupling a laser beam from the optical cavity and reflector means communicating with the unstable resonator for extracting power from a gain medium.

A primary feature of the present invention is the use of simple spherical mirrors to define an optical cavity capable of including a large volume of gain medium. Power extraction occurs in the gain region of the optical cavity and mode discrimination is accomplished in the unstable resonator defining one end of the optical cavity.

A primary advantage of the present invention is the good mode discrimination characteristics of the unstable resonator which is capable of providing an intracavity wave having the lowest order mode. Additionally the spherical mirrors defining the optical cavity are relatively inexpensive compared to the cost of aspheric mirrors. Also the optical flux in the gain medium is efficiently extracted by the intracavity wave to provide high power within the stable resonator which is capable of being coupled into a laser beam having high power. High optical quality of the laser beam is obtained by the effective discrimination against high order transverse modes provided by the unstable resonator and by the continuous cross section of the beam provided by the aperture coupling of the optical power in the stable resonator. A further advantage is that the restraints imposed by superfluorescence on the maximum volume of gain medium capable of being disposed in an optical cavity can be accommodated without limiting the volume of the gain medium.

The foregoing and other objects, features and advantages of the present invnetion will become more apparent in the light of the following detailed description of preferred embodiments thereof as discussed and illustrated in the accompanying drawing.

DESCRIPTION OF THE PREFERRED EMBODIMENT

Figure 1:
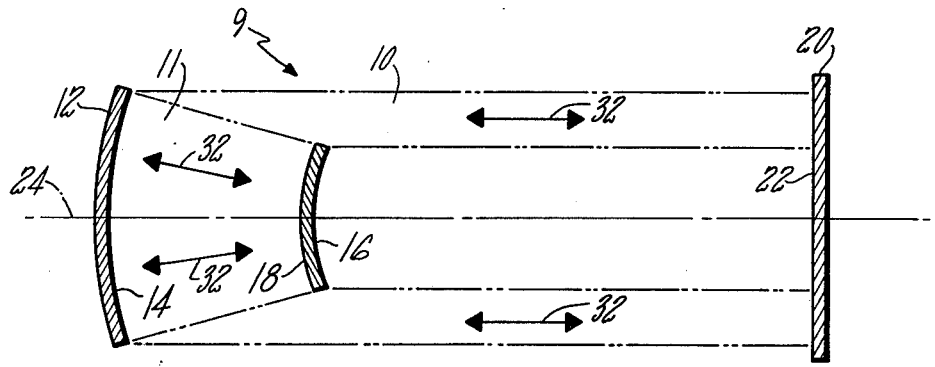
FIG. 1 is a simplified cross sectional view of a stable resonator showing the principal optical elements in accordance with the present invention.

A stable resonator 9 in accordance with the present invention is shown in FIG. 1. An optical cavity 10 defined at one end by an unstable positive branch confocal resonator 11, formed with a concave mirror 12 having a first reflective surface 14 and a convex mirror 16 having a second reflective surface 18, and defined at the other end by an end mirror 20 having a planar reflective surface 22, is shown with each mirror concentrically positioned about a centerline axis 24.

Figure 2:
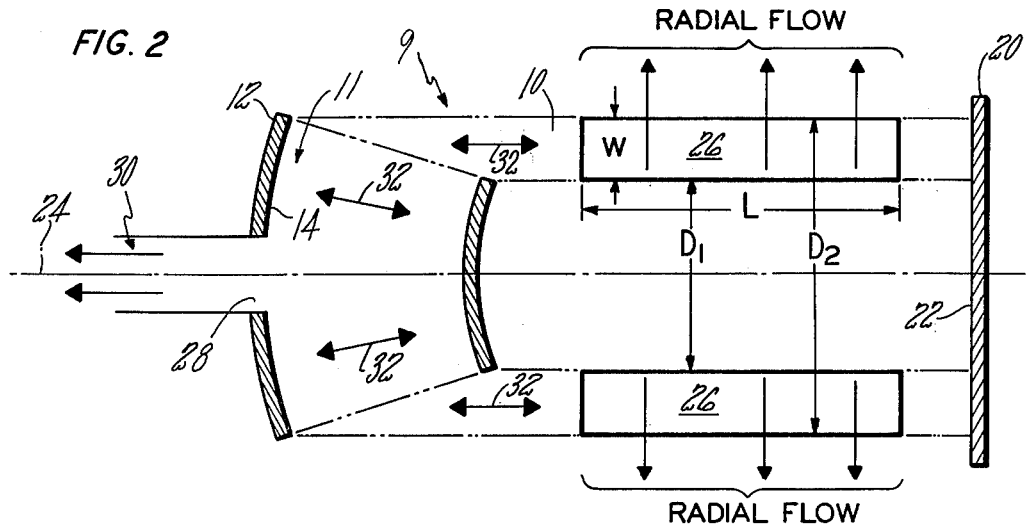
FIG. 2 is a simplified cross sectional view of a stable resonator showing the principal optical elements of the present invention cooperating with a gain region to provide a laser beam.

A stable resonator which is designed to accomodate a maximum volume of gain medium without incurring superfluorescence and has components which are directly comparable to those of the stable resonator 9 shown in FIG. 1 is shown schematically in FIG. 2. An annular gain region 26 having a radial width W and length L is disposed in the optical cavity 10 between the end mirror 20 and the resonator 11 and is concentrically positioned about the centerline axis. Aperture 28, centrally located inthe concave mirror 12 for coupling a laser beam 30 from the stable resonator 9, is concentrically positioned about the centerline axis.

A gas source region (not shown) is disposed interior to and symmetric with the annular gain region 26 and is concentrically positioned about the centerline axis. The gas source region usually contains a combustor and nozzle means which provide the required supply of suitably inverted working medium to the gain region. The working medium is provided around the entire inner circumference of the gain region and flows through the gain region radially away from the centerline axis 24.

Figure 3:
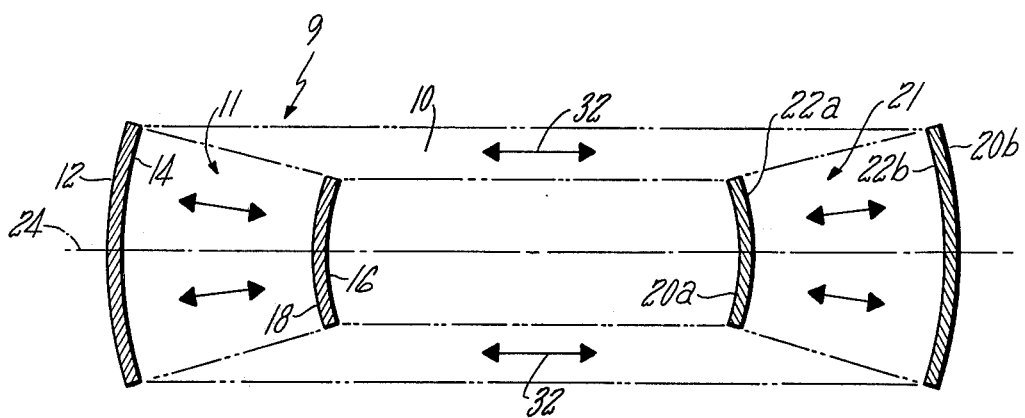
FIG. 3 is a simplified cross sectional view of an embodiment of the present invention in which the flat reflector shown in FIGS. 1 and 2 is replaced by a second unstable resonator.

FIG. 3 shows an embodiment of the stable resonator 9 in which the end mirror 20 of FIGS. 1 and 2 is replaced by a second unstable resonator 21 having a second convex mirror 20a with a third reflecting surface 22a, and a second concave mirror 20b with a fourth reflecting surface 22b.

Referring again to FIG. 1, the resonator 11 is a converging/diverging wave system in which an intracavity wave 32 having the lowest order mode expands on repeated bounces between the convex and concave mirrors to fill the entire surface area of the convex mirror. The wave further expands to the concave mirror where it is reflected out of the unstable resonator into the optical cavity in a collimated annular configuration. The resultant collimated annular wave is particularly suited for power extraction from the annular gain configuration of chemical lasers.

The resonator 11 serves as a mode control resonator capable of producing the wave 32 having the lowest order mode. In operation the wave is directed to the end mirror 20 where it is reflected back into the resonator 11 and compressed toward the centerline axis upon successive reflections within the resonator. Eventually, diffractive spreading causes the compressed inwardly propagating wave to expand, which transforms the compressed wave back into an outward propagating wave and the cycle is repeated. Geometric rays can be trapped indefinitely within the optical cavity 10 defined by the resonator 11 and the end mirror 20, and the net result is a stable resonator. It is to be recognized that the end mirror could have a flat reflecting surface of a reflective surface in the form of an annulus. the mirrors defining the unstable resonator 11 have simple spherical configurations resulting in comparative ease of manufacture and lower cost as contrasted to the aspheric mirrors typically utilized to extract power from a radial flow laser such as a chemical laser.

Referring again to FIG. 2. In operation a wave having the lowest order mode exits the resonator 11 as a collimated annular wave which passes through the annular gain region 26, efficiently extracting energy therefrom, is reflected by the end mirror 20 back through the annular gain region, extracting additional energy, and into the resonator 11 where the wave is compressed by repeated reflections and exits the stable resonator through the aperture 28 as a coherent laser beam 30 having a continuous cross section. The optical quality of the laser beam along the centerline axis 24 is good as a consequence of the proper transformation of the wave within the resonator 11 because the Fresnel number is low enough to produce effective diffractive cross coupling of the phase fronts from various portions throughout the annular gain region.

The diffractive cross coupling within the resonator 11 provides the uniform phase characteristics of the laser beam. This cross coupling transforms the annular portions of the wave 32 into an axially propagating laser beam 30, all portions of which are in phase coherence with one another. The actual diffractive cross coupling occurs in the immediate vicinity of the centerline axis 24 which is the diffraction dominated portion of the resonator 11.

The operation of many high power lasers requires that the optical flux in the gain region of the resonator be as high as possible to efficiently saturate the gain of the working medium and to effectively extract the available power from the resonator. This is particularly important for regions exhibiting the largest small signal gain such as those near the inside surface of the cylindrical sheath of the gain region. An inability to saturate the extraction process limits the power output from such a resonator to something less than what is otherwise available. As previously noted the collimated annular wave 32 of the present invention is particularly suited for power extraction from the annular gain configuration of chemical lasers.

The generation of high power laser beams requires that a large volume of gain medium be available for power extraction. However the condition imposed by superfluorescence must be observed in determining the dimensions of the gain region. The volume of the annular gain region 26 of the stable resonator 9 can be increased almost without limit while maintaining the conditions imposed by superfluorescence by increasing the inside diameter $D_1$ of the annular gain region 26 as the outside diameter $D_2$ is increased. As the inside and outside diameters are increased, the cross sectional area increases, resulting in a corresponding increase in the volume of the annular region. Increasing the length L of the annular gain region also increases the volume. The dimensions of the resonator 11 are matched to the dimensions of the annular gain region and the diameter of the aperture 28 in the concave mirror 12 is dependent upon the gain of the annular gain region.

As a practical matter, the maximum value of optical flux which can be tolerated in the stable resonator 9 is usually determined by the capacity of the reflective surfaces of the mirrors. In the resonator configuration shown in FIG. 2 the optical flux in the central region of the resonator 11 is much greater than the optical flux in the annular gain region. The ratio of optical flux in the annular gain region to optical flux in the central region of the resonator 11 is given by the ratio of their respective cross sectional areas.

Referring again to FIG. 3 which shows an embodiment of the present invention. The collimated annular wave 32 passes into the second resonator 21 which preferably has a configuration identical to the resonator 11, and is compressed toward the centerline axis where diffractive cross coupling of the wave fronts from various portions throughout the annular gain region occurs to provide effective discrimination against high order transverse modes. When this embodiment is applied to the stable resonator 9 as shown in FIG. 2, the second resonator 21 is capable of providing the mode control of the wave permitting greater flexibility in the dimension of the aperture 28 to obtain variations in the characteristics of the laser beam 30.

Although this invention has been shown and described with respect to preferred embodiments thereof it should be understood by those skilled in the art that various changes and omissions in the form and detail thereof may be made therein without departing from the spirit and scope of the invention.

Having thus described a typical embodiment of my invention that which I claim as new and desire to secure by Letters Patent of the U.S. is:

1. A stable resonator comprising:
   an optical cavity,
   an unstable resonator defining one end of the optical cavity, and
   reflector means, in optical communication with the unstable resonator, defining the other end of the optical cavity wherein the reflector means is adapted for cooperating with the unstable resonator to form a stable resonator whereby radiation passing from the unstable resonator is reflected back into the unstable resonator.

2. The invention according to claim 1 wherein the reflector means is a mirror having a flat reflective surface.

3. The invention according to claim 1 wherein the reflector means is a mirror having a reflective surface which forms an annulus.

4. The invention according to claim 1 wherein the unstable resonator and the reflector means are positioned on and symmetrically about a centerline axis.

5. The invention according to claim 1 wherein the unstable resonator comprises:
   a concave mirror having a first reflective surface, and
   a convex mirror having a second reflective surface in optical communications with the first reflective surface.

6. The invention according to claim 1 wherein the reflector means is a second unstable resonator.

7. The invention according to claim 6 wherein the second unstable resonator comprises:
   a second convex mirror having a third reflective surface, and a second concave mirror having a fourth reflective surface in optical communication with the third reflective surface.

8. A stable resonator having a centerline axis comprising:
   an optical cavity,
   an unstable resonator defining one end of the optical cavity,
   reflector means, in optical communication with the unstable resonator, defining the other end of the optical cavity wherein the reflector means is adapted for cooperating with the unstable resonator to form a stable resonator whereby radiation passing from the unstable resonator is reflected back into the unstable resonator, and
   means for coupling a laser beam from the stable resonator.

9. The invention according to claim 8 wherein the unstable resonator comprises:
   a concave mirror having a first reflective surface, and
   a convex mirror having a second reflective surface in optical communication with the first reflective surface.

10. The invention according to claim 8 including a gain medium disposed in the optical cavity symmetrically about the centerline axis.

11. The invention according to claim 8 wherein the gain medium has an annular configuration.

12. The invention in accordance with claim 11 wherein the gain medium is disposed within the optical cavity symmetrically about the centerline axis between the unstable resonator and the reflector means.

* * * * *

UNITED STATES PATENT AND TRADEMARK OFFICE
CERTIFICATE OF CORRECTION

PATENT NO. : 4,123,150
DATED : October 31, 1978
INVENTOR(S) : Edward A. Sziklas

It is certified that error appears in the above-identified patent and that said Letters Patent are hereby corrected as shown below:

Column 3, line 4: "invnetion" should read --invention--

Column 3, line 33: "accomodate" should read --accommodate--

Column 3, line 42: "inthe" should read --in the--

Column 4, line 17: "of" should read --or--

Column 4, line 18: "the" should read --The--

Column 6, claim 11, line 49: "8" should read --10--

Signed and Sealed this

Twentieth Day of February 1979

[SEAL]

Attest:

RUTH C. MASON
Attesting Officer

DONALD W. BANNER
Commissioner of Patents and Trademarks